United States Patent [19]

Wagner

[11] Patent Number: 5,005,095

[45] Date of Patent: Apr. 2, 1991

[54] ACTUATOR FOR LINEARIZING TORQUE IN A DISK DRIVE SYSTEM

[75] Inventor: J. Arthur Wagner, San Jose, Calif.

[73] Assignee: Maxtor Corporation, San Jose, Calif.

[21] Appl. No.: 518,078

[22] Filed: May 2, 1990

[51] Int. Cl.⁵ .............................................. G11B 5/55
[52] U.S. Cl. .................................. 360/106; 360/107; 360/97.01; 310/36
[58] Field of Search .............................. 360/106–109, 360/97.01; 310/12, 36, 38; 369/215, 119

[56] References Cited

U.S. PATENT DOCUMENTS

| | | | |
|---|---|---|---|
| 4,135,119 | 1/1979 | Brosens | 310/36 |
| 4,462,054 | 7/1984 | Dong et al. | 310/12 |
| 4,686,397 | 8/1987 | Beeker | 310/36 |
| 4,805,055 | 2/1989 | Wright | 360/97.01 |
| 4,908,816 | 3/1990 | Champagne et al. | 310/12 |

FOREIGN PATENT DOCUMENTS

| | | | |
|---|---|---|---|
| 53-20908 | 2/1978 | Japan | 360/106 |
| WO8810951 | 12/1988 | PCT Int'l Appl. | 360/97.01 |
| 2127610 | 4/1984 | United Kingdom | 360/97.01 |

OTHER PUBLICATIONS

Patent Associated Literature, IBM Journal of Research and Development, vol. 20, No. 4, pp. 389–397, Jul. 1976, by Heath.

Brown et al., "Time-Optimal Control of a Moving Coil Actuator", IBM Journal Research and Development, Sep. 1968, pp. 372–379.

Honds et al., "A Linear D.C. Motor With Permanent Magnets", Philips Technical Review, No. 11/12, pp. 329–337, 1982.

Hiyane et al., "Development of Linear Motion Actuator", Fijitsu Scientific & Technical Journal, Jun. 1972, pp. 59–82.

Primary Examiner—Robert S. Tupper
Assistant Examiner—Alfonso Garcia
Attorney, Agent, or Firm—Blakely, Sokoloff, Taylor & Zafman

[57] ABSTRACT

An improved rotary actuator for torque linearization in a disk drive recording system is described. A notch is formed in the actuator frame at a point midway along one of the sidewalls of a pair of circumferential slots which define a centerpole member therebetween. These slots house the actuator coil. The notch increases the air gap between the coil and the frame at the midpoint of the data stroke. This reduces the flux density at the midpoint of the data stroke which linearizes the torque of the actuator as a function of the angular position of the coil (i.e., the coil arc). In addition, the dimension of the centerpole member which extends beyond the sweep of the coil during a data stroke is widened to decrease the air gap in these regions.

12 Claims, 6 Drawing Sheets

FIG_1

FIG—2

FIG_3 (PRIOR ART)

FIG_4A

FIG_5

FIG_6

FIG_7 (PRIOR ART)

FIG_8

ACTUATOR FOR LINEARIZING TORQUE IN A DISK DRIVE SYSTEM

FIELD OF THE INVENTION

The present invention relates to the field of magnetic disk recording systems; more specifically, to the generation of torque in a moving coil actuator.

BACKGROUND OF THE INVENTION

In the field of magnetic recording, rigid-disk drive systems have enjoyed widespread popularity. A rigid-disk drive system generally includes a stack of disks mounted on a spindle which are rotated by a motor inside an enclosure. The enclosure has a controlled air supply to minimize internal contamination.

Reading and writing of binary digital information is achieved with an array of transducers, each provided with a spring suspension attached to an arm assembly. The transducers, or heads, are individually mounted on sliders which are loaded against the surface of the rotating disk medium by the spring succession. The arm-assemblies are connected to a common spindle which are positioned by an electro-magnetic actuator to provide selective access of the heads to any desired track on the disk. Movement of the electro-magnetic actuator is controlled by a signal from a control track on the disk medium. Usually one head near the center of the head stack is reserved for reading the control signal. The actuator itself is only one part of the control system which is used to control the movement of multiple head-arm assemblies across the disk surface. The control system also includes electronic circuitry, servo mechanisms, etc., which operate in concert with the actuator to position and maintain the heads over the desired data track, as well as minimizing track misregistration, during reading/writing of information.

High performance disk drive systems commonly employ a moving coil actuator (e.g., a voice coil motor) for positioning the magnetic recording heads. Coarse positioning, which involves moving the heads from one data track to another, is accomplished by controlling the actuator and transducers in a velocity feedback loop. After a coarse position move is executed, the feedback loop settles the transducers on the selected data track and continues following the data track for normal read/write operations.

An important parameter in a feedback control loop is the torque of the moving coil actuator. Ideally, the torque of a moving actuator is constant with position. That is, a linear torque renders the loop's dynamic response uniform with coil position. As the coil subtends the arc created when the actuator pivots about its spindle axis, the torque generated in the coil should be constant throughout. The linearity of the torque curve is important since it influences the access time of the magnetic recording system. Generally speaking the more linear the torque curve, the faster the access time.

Consider, by way of example, how torque affects the settling time at the end of an access. Any variation of the torque with angular position causes a variation in the open loop gain of the track following servo mechanism. The larger the magnitude of the variation in torque, the larger the resultant difference in the servo system response characteristics. Ultimately, this results in a longer, worse-case settling time.

Another problem has to do with the fact that large variations in torque can also lead to stability problems during track following.

As one might expect, in reality the torque of an actuator varies with the angular position of the coil. In other words, as the coil moves during a data stroke (e.g., movement of the transducer from an inner radial position over the magnetic disk, to an outside radial position) the force being applied to the coil varies as a function of the location of the coil on the coil arc. The data stroke comprises most of the coil arc.

The factors contributing to a non-linear torque in a disk drive system are numerous. First of all, because the disk drive enclosure geometrically bounds the actuator volume, the steel and magnetic materials which comprise the magnetic core limit the actuator magnetically to practical flux density levels. The difficulties with control of power supply and disk drive heat dissipation constrain the actuator coil current. Both of these factors present difficulties which must be overcome if a linear torque curve is to be achieved.

Furthermore, because the coil tends to be more intimate with the magnets near the center of the data stroke, as opposed to the data stroke endpoints, flux density in the center region is considerably higher than at the endpoint regions. This higher flux density generates a larger torque which, in turn, contributes to a non-linearity and longer access times. Given the numerous volumetric, magnetic and current constraints, past approaches have found it difficult to achieve a substantially linear torque curve in a rotary moving coil actuator.

The present invention covers an improvement to a moving coil actuator which renders the associated torque curve substantially linear with position. The overall flattening of the torque curve helps to improve access time for the magnetic recording system; both in the coarse positioning and in the settling portion of the access period.

SUMMARY OF THE INVENTION

The function of a moving coil actuator in a disk drive system is to provide a torque which moves the recording heads, i.e., transducers, over the magnetic disk surface. This torque is characterized by a torque curve which graphically describes the applied force as a function of angular position throughout the data stroke. The primary purpose of the present invention is to render more linear the torque curve for a rotary moving coil actuator (i.e., voice coil motor) used in a rigid disk drive. Linearizing the torque reaches the average access time by providing a more controllable motor for the servo system.

In conjunction with one embodiment of the present invention, the improved actuator comprises a steel core or frame having a pair of circumferential slots cut through the steel core. The main body of the actuator pivots about a fixed point with the transducers themselves being attached to actuator arms secured to one end of the actuator body. The other end of the actuator body is secured to a wire coil. A pair of magnets are mounted to the frame along the inside walls of the respective slots.

When assembled, the coil passes through the slots and adjoins each of the magnets. Current flow through the coil causes movement of the coil and actuator body around the pivot point. Thus, the coil traces an arc across during a data stroke.

The actuator further comprises at least one notch formed in the frame at a point along at least one of the sidewalls of the circumferential slots. This notch increases the air gap, through which the magnetic flux flows, near the midpoint of the data stroke. This reduces the flux density in the center region of the air gap, thereby helping to linearize the torque of the actuator as a function of the angular position of the coil. In the preferred embodiment, the edges of the notch are aligned with the coil edges when the coil is on either end of the data stroke.

An additional feature of the present invention is the decreased air gap at the endpoints of the data stroke outside of the arcuate path swept by the coil. Decreasing the air gap in this region raises the torque curve near the ends of the coil arc. Additional steel is also added to the frame near each end of the coil arc to increase the flux density in these regions. The edge of the added steel is substantially parallel to the edge of the coil at the endpoints of the data stroke.

Further improvements include employing wider magnets with respect to the coil arc to help raise the torque curve near the ends of the data stroke. Other features and advantages of the present invention will be understood from the detailed description which follows.

BRIEF DESCRIPTION OF THE DRAWINGS

The present invention is illustrated by way of example and not limitation in the figures of the accompanying drawings, in which like references indicate similar elements, and wherein:

FIG. 4A illustrates several key features of the present invention including the relationships of the notch to the coil near one endpoint of the arcuate path traced by the coil during a data stroke.

DESCRIPTION OF THE PREFERRED EMBODIMENTS(S)

An improved actuator for linearizing torque in a disk drive recording system is described. In the following description, numerous specific details are set forth, such as materials, dimensions, distances, etc., in order to provide a more thorough understanding of the present invention. However, it will be obvious to one skilled in the art that the present invention may be practiced without these specific details. In other instances, well-known elements have not been shown or described to avoid unnecessarily obscuring the present invention.

Figure 1:
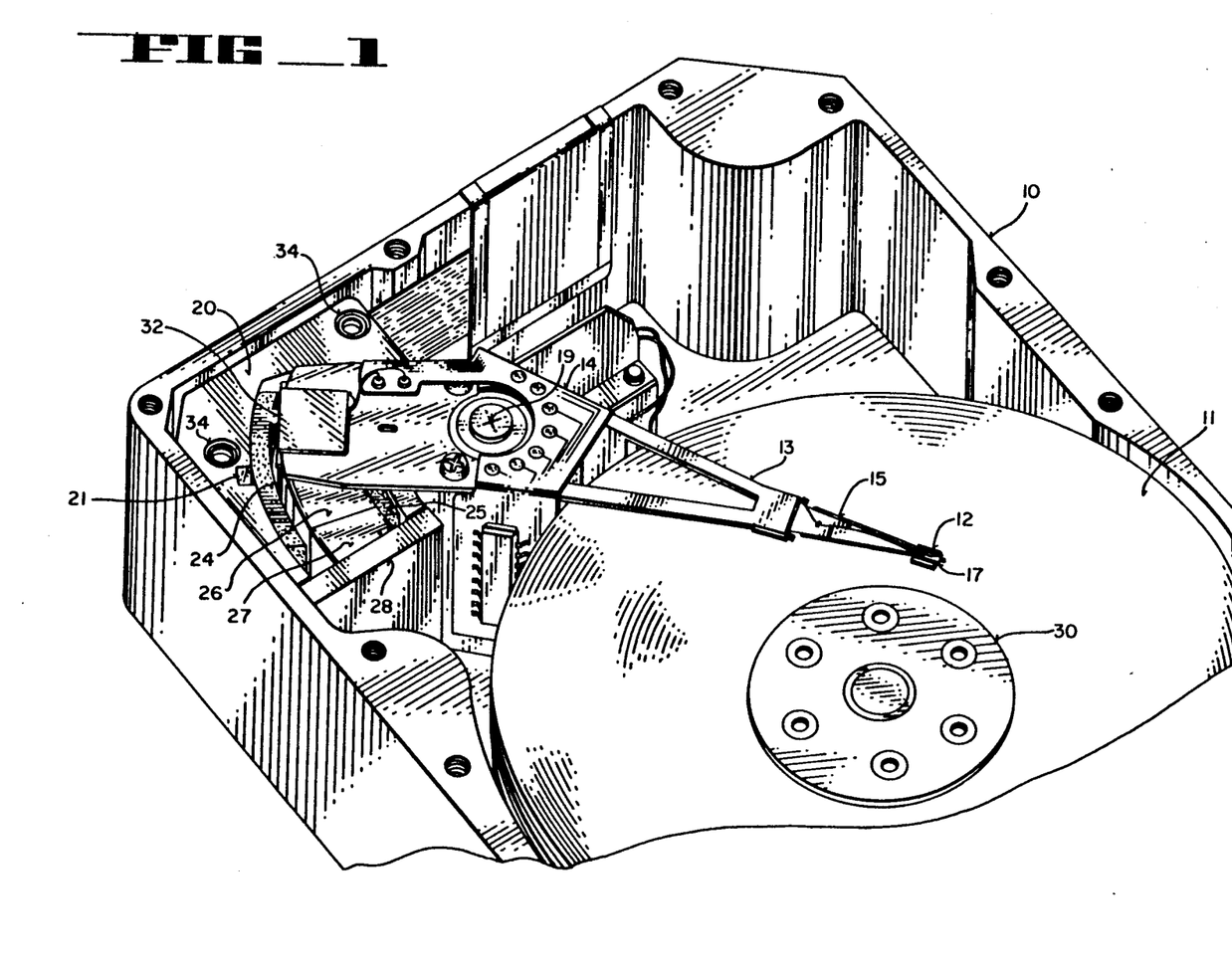
FIG. 1 is a perspective view of a rigid-disk drive system employing the improved actuator of the present invention.

Referring to FIG. 1, there is shown a rigid-disk drive enclosure 10 housing a plurality of magnetic disks 11. Disks 11 are rotatably mounted to a central hub 30. The actuator of FIG. 1 comprises a body 14 which is pivotable about a point 19. Actuator body 14 includes a plurality of actuator arms 13 each having a first end secured to body 14, and a second end attached to a load spring member 15. A gimbal spring 17, which is secured to the end of each load spring member 15, supports transducer 12. While load spring member 15 loads the transducer against the surface of the magnetic disk 11, gimbal spring 17 permits transducer 12 to move vertically and to pitch roll as it flies over the rotating surface of disk 11.

A wire coil 32 is attached to the other side of actuator body 14 such that pivot point 19 lies at a location intermediate between coil 32 and actuator arm 13. Coil 32 comprises an ordinary copper wire which is continuously wrapped and formed into a substantially rectangular shape. The remaining portions of the moving coil actuator of FIG. 1 include a steel frame 20, steel endplate 28 and magnets 24 and 25. Frame 20 is mounted to enclosure 10 via screw holes 34. Magnets 24 and 25 are attached to the inside surfaces of a pair of circumferential slots machined across the center of frame 20 so as to be substantially parallel to each other. The slots define a center pole member 29 (not shown in FIG. 1) which is partially covered by a sleeve member 26. A second sleeve member 27, which preferably is made of steel, covers the end of centerpole member 29 near endplate 28. The interrelationship and function of each of the above listed elements will be discussed in more detail later.

When assembled, coil 32 completely surround centerpole member 29 (including sleeve member 26) such that two of the active coil sides are positioned substantially perpendicular to the plane of disks 11. When a current is passed through coil 32, coil 32 moves radially through the slots in frame 20, thereby causing rotational movement of actuator body 14 about axis point 19. In effect, coil 32 traces an arcuate path radially about centerpole member 29. The two extreme ends of the slots correspond to the endpoints of a data stroke. In the currently preferred embodiment, coil 32 sweeps through an arc of approximately 21.8° when moving from one end of the data stroke to the other.

In accordance with the currently preferred embodiment of the present invention, the actuator of FIG. 1 also includes a notch 21 cut into frame 20 directly behind magnet 24. As will be described in detail shortly, notch 21 flattens the center of the torque curve by reducing the flux density in the center region of the arcuate path traced by coil 32 during a data stroke. Notch 21 is roughly ¼ of an inch wide and ⅜ths of an inch deep. Notch 21 preferrably extends completely through frame 20 from top to bottom.

Figure 2:
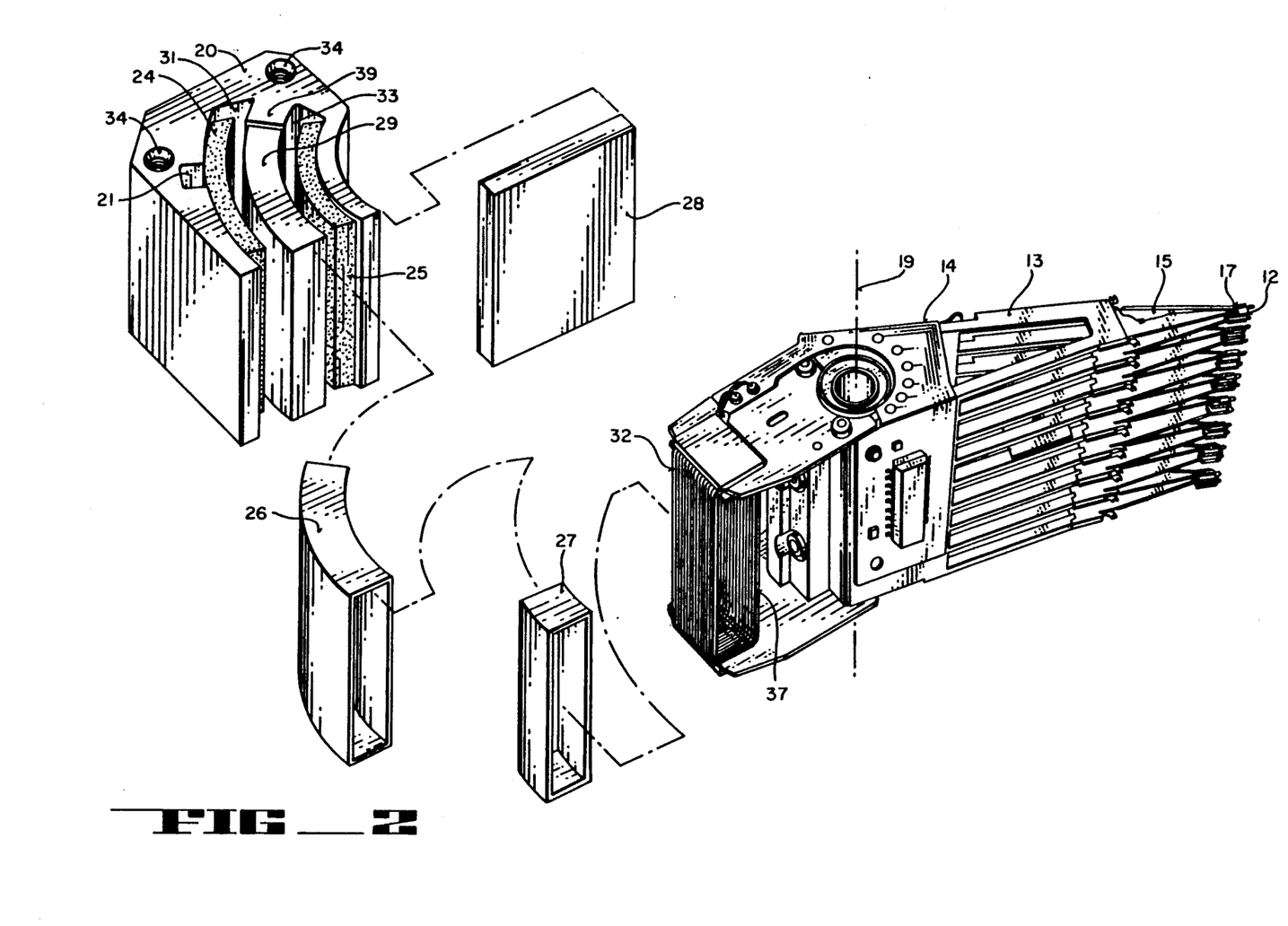
FIG. 2 is an exploded view of the actuator shown in FIG. 1.

With reference now to FIG. 2, an exploded view of the actuator of FIG. 1 is illustrated. As is more clearly seen, actuator body 14 is attached to a plurality of actuator arms 13, which, in the currently preferred embodiment comprise nine arms corresponding to the eight rotating magnetic disks 11 (not shown in FIG. 2). Two transducers 12 are associated with each magnetic disk in accordance with conventional double-sided recording. Also shown in FIG. 2 is rectangularly-wound coil 32 through which is defined space 37.

Steel frame 20 comprises a pair of radially cut lots 31 and 32 defining centerpole member 29 therebetween. Magnets 24 and 25 are radially shaped to conform to the sidewalls of slots 31 and 33, respectively, opposite centerpole 29. Magnets 24 and 25 are ordinarily glued to the inner sidewalls of the slots and may comprise any one of a number of magnetic materials such as ferrite, etc. Note that neither magnet 24 nor magnet 25 are directly attached to centerpole member 29.

FIG. 2 further illustrates how the present invention utilizes steel sleeve 27, covering the end portion of centerpole 29, to reduce the air gap at the end of the stroke nearest to endplate 28. At the opposite end of centerpole 29 is widened land member 39. Both land members 39 and sleeve 27 are wider when compared to centerpole member 29 in order to reduce the air gap beyond the endpoints of the data stroke traced by coil 32. This increased steel mass beyond the endpoints of the data stroke increases the flux density outside of the arc swept out by coil 32. The increased flux density, due to the decreased air gap at each end, helps to linearize the torque as a function of angular position.

Sleeve 26 comprises a rectangular-shaped hollow copper sleeve which is matched to the outer dimensions of centerpole member 29. During the manufacturing process sleeve 26 is slid over centerpole member 29 after frame 20 is machined. As is well-known in the art, copper sleeve 26 improves the rise time of the coil current during accessing of information.

In accordance with the present invention, an additional steel sleeve 27 is fitted adjacent to copper sleeve 26. As mentioned, the purpose of steel sleeve 27 and land member 39 is to reduce the air gap in the regions near the ends of centerpole member 29, just beyond the extent of the coil arc. In the currently preferred embodiment, the thickness of sleeves 26 and 27 is about 21 thousandths of an inch. Because steel has a fairly low reluctance, it is the preferred material of sleeve 27 (air has a comparatively high reluctance). When assembled, the center region of centerpole 29 is wrapped with copper (i.e., sleeve 26) while the end portion nearest endplate 28 is wrapped with steel (i.e., sleeve 27).

Next in the manufacturing process, coil 32, attached to actuator body 14, is inserted over sleeve 27. Space 37 is sufficiently wide to accommodate the dimension presented by sleeve 27 with a minimum air gap therebetween. That is, the clearance between sleeve 26 and the vertical side portions of coil 32 is kept to a minimum to increase the flux density; most importantly, in the regions beyond the endpoints of the data stroke.

To complete the manufacturing process, steel endplate 28 is attached to frame 20 to close the openings presented by slots 33 and 31. In doing so, endplate 28 provides a low reluctance path for the magnetic flux lines to pass near the endpoint of the data stroke.

Figure 3:
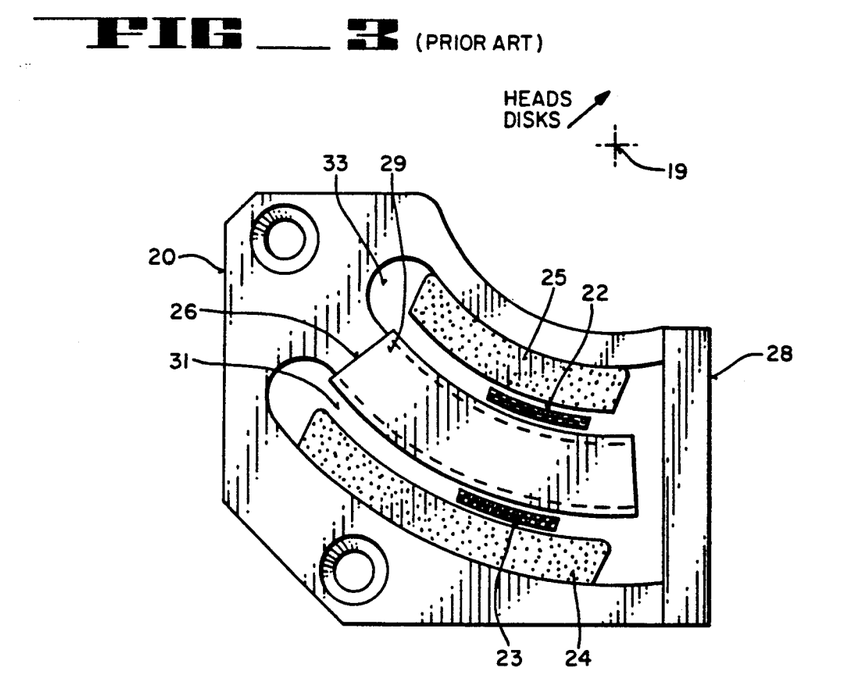
FIG. 3 is a top view of a portion of a prior art actuator.

FIG. 3 illustrates a top view of a prior art actuator including steel frame 20 having slots 31 and 33 into which are mounted magnets 24 and 25, respectively. A cross-sectional view of coil 32 shows two coil sides 23 and 22 which correspond to the vertical portions of coil 32. Coil side 22 adjoins magnet 25 while coil side 23 adjoins magnet 24. Copper sleeve 26 surrounds centerpole member 29 as described above. The torque curve associated with the actuator of FIG. 3 is characterized as having a relatively high amplitude in the center of the data stroke (where flux density is greatest) and a relatively low amplitude at the endpoints (where flux density is smallest) of the data stroke.

Figure 4A:
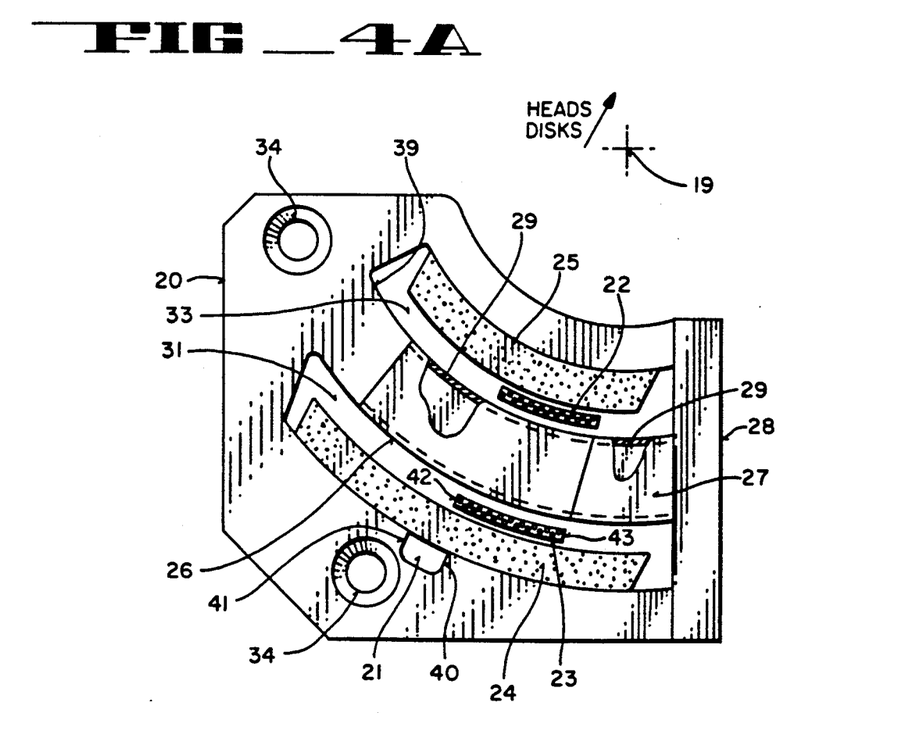
FIG. 4A is a top view of the relevant portions of the currently preferred embodiment of the improved actuator of the present invention.
Figure 4B:
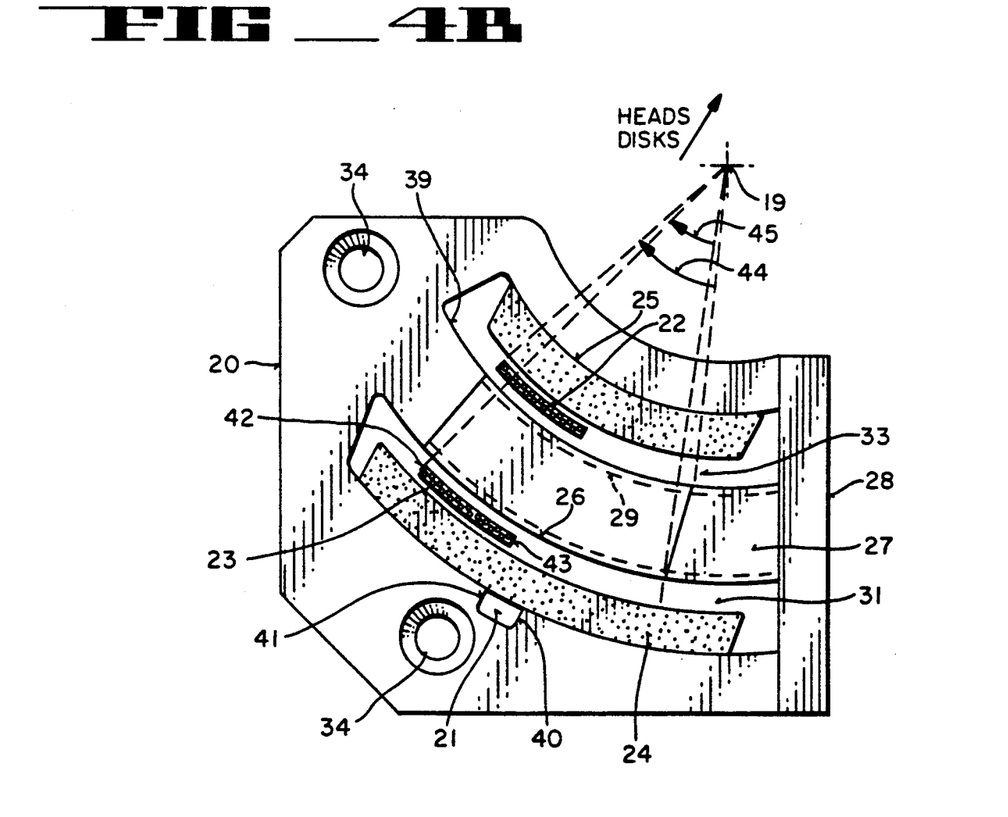
FIG. 4B illustrates the actuator of FIG. 4A, except that the coil is shown at the opposite endpoint of the arcuate path.

FIGS. 4A and 4B show a top view of the pertinent portions of the actuator of the currently preferred embodiment of the present invention. FIGS. 4A and 4B illustrate several key aspects of the present invention. To begin with, the actuator of the present invention includes sleeve 27 for increasing the flux density at the end of the data stroke nearest endplate 28. Sleeve 27 comprises a steel member which is slightly larger and more massive when compared to a similar lengthed section of centerpole member 29. The inclusion of sleeve 27 effectively creates a second land area near endplate 28 which has a mass basically equivalent to that of land area 39 formed at the opposite end of centerpole member 29.

Slots 31 and 33 are formed in steel frame 20 and include magnets 24 and 24 mounted along the side wall portions opposite centerpole member 29 similar to that shown in FIG. 3. Coil side 22 adjoins magnet 25 while coil side 23 adjoins magnet 24. Observe that magnets 24 and 25 in FIGS. 4A and 4B are wider with respect to the coil arc than those illustrated in FIG. 3. That is, they extend further beyond the arcuate path traced by coil 32. Wider magnets have the effect of increasing the flux density around the endpoints of the data stroke. This raises the torque curve at the ends of the coil arc.

Another improvement is found by considering the ends of slots 31 and 33 farthest from end plate 28 in FIGS. 4A and 4B. When compared to the same regions in the prior art actuator of FIG. 3, these slot ends are straighter and more sharply defined. This shape effectively moves the steel away from the ends of magnets 24 and 25. Again, this raises the torque at the end of the data stroke nearest land area 39. As previously mentioned, steel sleeve 27 has a larger steel mass relative to centerpole member 29 to increase the flux density at this end of the data stroke.

FIGS. 4A and 4B also show notch 21 formed in steel frame 20 on the sidewall portion of slot 31 where magnet 24 is mounted. Notch 21 is cut during the manufacturing of steel frame 20 and preferably extends through the full thickness of steel frame 20. Basically, notch 21 provides a region of decreased flux density in the center of the data stroke. By reducing the flux density in the center of the data stroke, i.e., at a point approximately midway between the endpoints of slot 31, the amplitude of the torque in this region is lowered. This helps to linearize the torque as a function of the angular position of the coil. (Angles 44 and 45 define the lengths of the coil side arcs in FIG. 4B, as shown by the vertical coil sides 22 and 23, respectively, of coil 32 across a data stroke.) The pivot point of actuator body 14 is shown in FIGS. 4A and 4B by crosshatch 19.

Note that in FIGS. 4A and 4B, notch 21 has two sides 41 and 40 which are generally perpendicular to a tangent drawn along the sidewall of slot 31. In the currently preferred embodiment, the width of notch 21, as measured by the distance between sides 41 and 40, is dictated by the width of coil side 23 and by angle 45. In other words, when coil 32 is positioned as shown in FIG. 4A (at the endpoint of the data stroke nearest steel endplate 28) notch side 40 coincides with end 42 of coil side 23. This means that the flux density at this endpoint of the stroke is unaffected by the presence of notch 21.

Hence, the flux density at the endpoints is always at a maximum due in part to the addition of sleeve 27.

When coil 32 is positioned as shown in FIG. 4B at the other endpoint of the data stroke, notch sidewall 41 coincides with edge 43 of coil side 23. This is essentially the same situation as described above; namely, notch 21 has practically no influence on the flux density near this endpoint. The flux density is maintained at a maximum due in part to land area 39.

However, as coil 32 traces an arcuate path from one endpoint to the other, the presence of notch 21 reduces the torque in the center region of the data stroke. By aligning the edges 43 and 42 of coil side 23 with sides 41 and 40, respectively, of notch 21, the reduced flux density caused by notch 21 helps to linearize the torque curve whenever any portion of coil side 23 passes through the middle of slot 31.

Of course, configuring notch 21 so that its side coincide with the edges of coil side 23 at the endpoints of the data stroke is simply one possibility. Notch 21 may be cut narrower, wider, deeper or shallower so as to achieve an optimum torque curve for the particular actuator employed. That is, different actuator parameters (e.g., magnet thickness, magnet material, frame mass, coil current, coil windings, etc.) will generally mandate different notch dimensions and/or configurations. The location of slot 21 may also vary for the same reasons.

Normally, the dimension and location of notch 21 are tailored to linearize the torque curve so as to decrease access time in the most efficient manner possible. The process is essentially one of optimization: for a given set of actuator parameters, the location, size, depth, etc., of notch 21 are tailored to make the torque curve as linear as possible. This process may be carried out empirically, i.e., by trial-and-error testing of various notch sizes, shapes, etc. Alternatively, the optimization process may be performed analytically; for example, by programming a digital computer using the various actuator parameters as inputs. In either case, it is appreciated by practitioners in the art that a variety of notch shapes and dimensions—other then the preferred embodiment shown in FIGS. 4A and 4B—may be realized with similar results.

Figure 5:
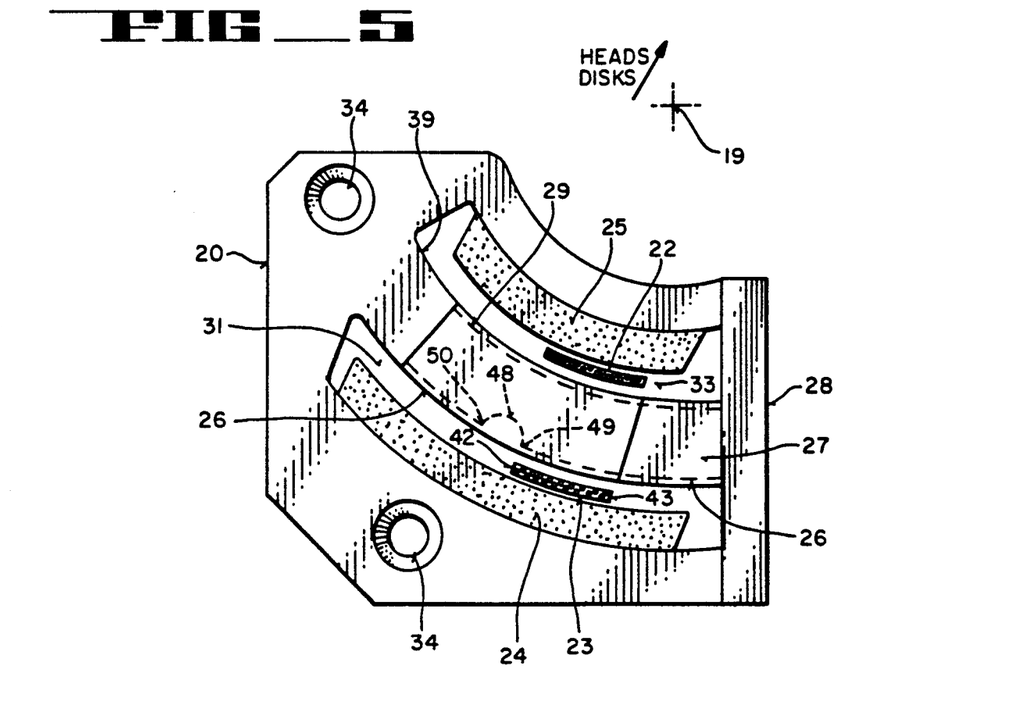
FIG. 5 shows an alternative embodiment of the present invention in which the notch is located along the centerpole member.

The alternative embodiment of FIG. 5 shows a notch 48 located along the midpoint of the centerpole member 29. FIG. 5 illustrates how the air-gap-producing notch of the present invention may be relocated to another region of steel frame 20 to achieve identical results.

Notch 48 has sides 49 and 50 which coincide with edges 42 and 43, respectively, of coil side 23 when coil 32 is at the endpoints of the data stroke. Copper sleeve 26 covers centerpole member 29 as before. Similarly, steel sleeve member 27 is shown attached at the end of centerpole member 29 for the reasons explained above. Obviously, notch 48 need not be confined to the shape illustrated in FIG. 5. Ordinarily, notch 48 is tailored in size, shape and location to meet the requirements of the particular magnetic recording system in which it is employed.

In the alternative embodiment of FIG. 5, land area 39 and steel sleeve 27 help to increase the flux density at the endpoints of the data stroke to raise the torque curve at those extreme angular positions. Meanwhile, notch 48 creates an air gap near the midpoint of the data stroke, i.e., in the center of the arc, to decrease the torque in that region. The result is a linearized torque curve which leads to higher access speeds.

Note that for the configuration shown in FIG. 5, it would generally be undesirable to locate notch 48 along either side of slot 33. Since, in the currently preferred embodiment, the arc path of coil 32 is approximately 21.8°, the outer edges of coil side 22 overlap each other at the extreme endpoints of the data stroke. In other words, any air gap formed along the side wall of slot 33 would necessarily overlap coil inside 22 when coil side 22 is in either one of its endpoint positions. Any overlap between the notch and coil side 22 will reduce the flux density beyond the end of the coil arc; which, as explained in detail above, is generally undesirable according to the present invention.

Note that for certain applications it may be possible to balance the loss of flux density caused by a notch located along slot 33 with the increased flux density generated by land areas 38 and sleeve member 27 to realize the goal of a more linearized torque curve. Needless to say, numerous alternative embodiments are well within the skill of an ordinary practitioner having read the foregoing discussion. Assuredly, the various parameters involved (e.g., notch size, depth, location, land area, sleeve thickness, etc.) will need to be optimized according to the particular disk drive system employed. Each of the embodiments described in this specification is considered to be within the spirit and scope of the present invention.

Figure 6:
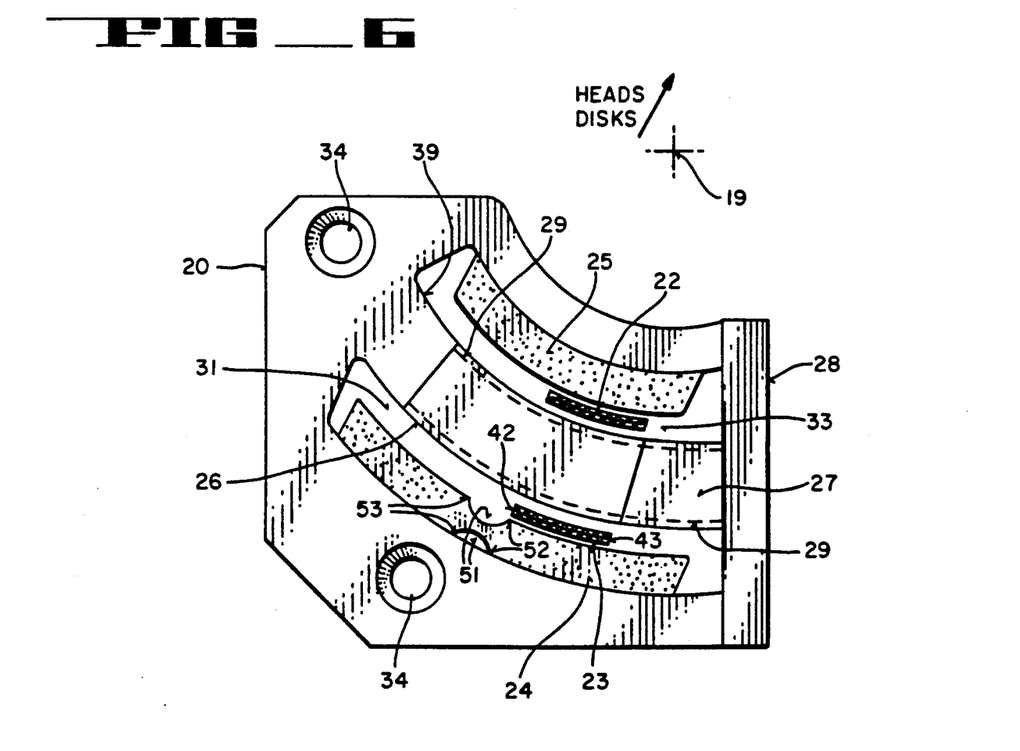
FIG. 6 is an alternative embodiment of the present invention in which a pair of matched notches are formed in one of the magnets.

Referring now to FIG. 6, yet another alternative embodiment is shown. The embodiment of FIG. 6 illustrates magnet 24 having a pair of opposed notches 51 located near the mid-point of the data stroke of coil 32. Notches 51 function in the same way as notches 48 and 21 of the previous embodiments; that is, notches 51 increase the air gap near the center of the arcuate path traced by coil side 23, thereby decreasing the flux density and torque at this angular position. It should be understood that there need not be two notches 51 formed in magnet 24. Alternative configurations may only employ a single notch rather than a pair of opposing notches, depending on the flux density requirements of the specific actuator used. Likewise, notches 51 may assume various shapes other than the semi-circular shapes shown in FIG. 6.

Analogous to the description above in connection with FIGS. 4 and 5, notches 51 include sides 52 and 53. Sides 52 coincide and are in general alignment with edge 42 of coil side 23 when coil 32 is in the endpoint position nearest to steel endplate 28. Flux density is increased at this endpoint by the presence of steel sleeve 27. At the other endpoint, i.e., nearest land areas 39, edge 43 of coil side 23 coincides and is in general alignment with sides 53 of notches 51. This insures that the flux density at this endpoint is increased due to the presence of land area 39.

In response to current flow through coil sides 22 and 23, actuator body 14 and coil 32 pivot about axis point 19. In doing so, coil side 23 overlaps notches 51, either in part or totally. As explained above, the increased air gap generated by notches 51 reduces the flux density in this overlap region, thereby helping to linearize the torque curve of the actuator. In the center of the data stroke, the coil 32 is most intimate with magnets 24 and 25. However, the higher flux lines normally associated with this center region are counteracted by the presence of notches 51 (or notches 48 or 21 in the previous embodiments). The result is a largely flattened torque curve over the data stroke.

Figure 7:
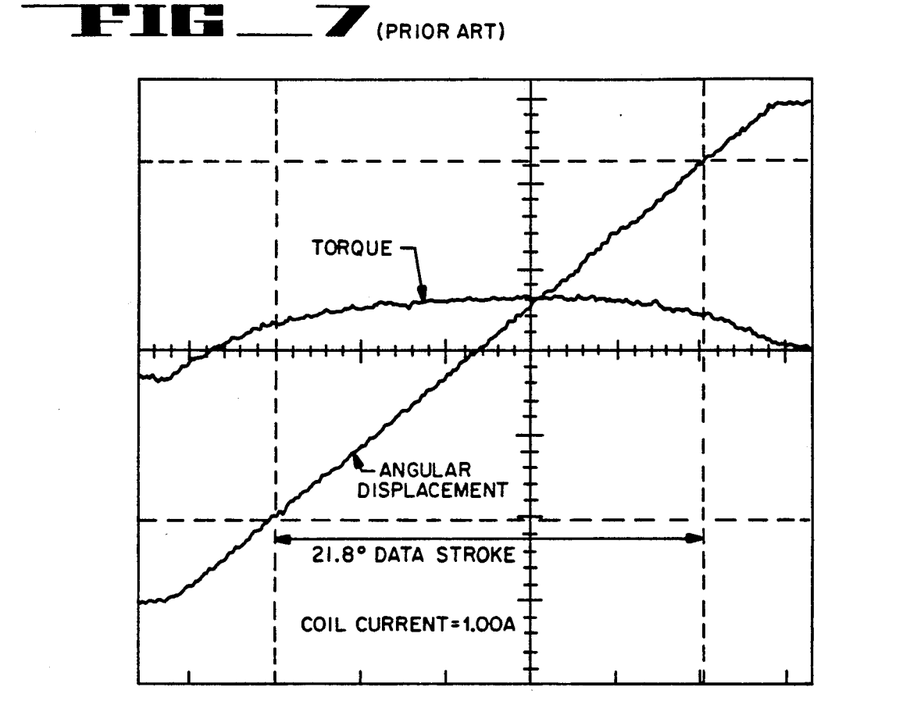
FIG. 7 is a plot of the torque and angular displacement generated in the coil of a prior art actuator as a function of the angular position of the coil.

FIG. 7 is a curve of the torque generated about a point of rotation 19. This torque appears as a force applied to the coil which is perpendicular to the radius of the rotating element. The torque curve of FIG. 7 was measured on the prior art actuator depicted in FIG. 3. As is clearly seen, the torque varies considerably across the full extent of the data stroke. Maximum torque is produced near the center of the data stroke where the coil is most intimate with the magnets, while at the extreme endpoints the torque is at a minimum due to a lower flux density in these regions.

Figure 8:
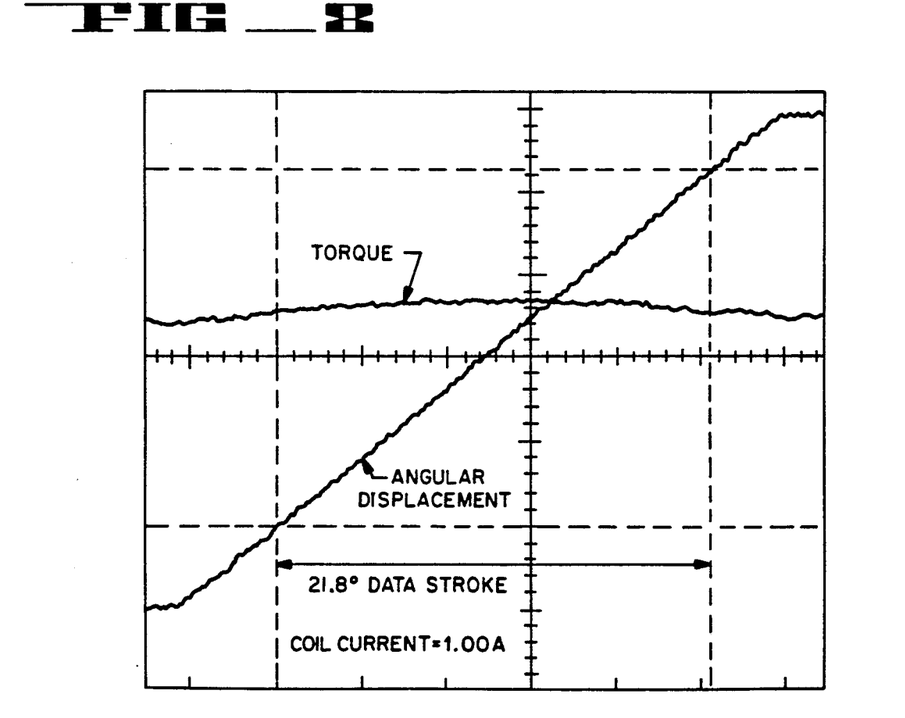
FIG. 8 is a plot of the torque and angular displacement generated in the coil for the improved actuator of the currently preferred embodiment of the present invention.

In contrast, FIG. 8 illustrates the torque curve generated by the currently preferred embodiment of FIGS. 4A and 4B. Note that torque is highly linear as a function of angular position of the coil (e.g., coil arc). It is appreciated that the highly linear torque curve of FIG. 8 is realized without compromising the relative amplitude of torque across the data stroke.

Whereas many alternations and modifications of the present invention will no doubt become apparent to a person of ordinary skill in the art after having read the foregoing description, it is to be understood that the particular embodiments shown and described by way of illustration are in no way intended to be considered limiting. For example, in alternative configurations the notch dimensions and/or location may vary or be tailored according to specific applications or system requirements. One possibility is a graduated or tapered notch side which extends across the full length of the arc traced by the moving coil, wherein the depth of the notch gradually varies as a function of angular position. Another alternative might be to form the notch so that it only partially extends through the steel frame thus compromising some of the flux loss due to the increased air gap. Therefore, reference to the details of the preferred embodiments are not intended to limit the scope of the claims with themselves recite only those features regarded as essential to the invention.

Thus, an improved actuator for linearizing torque in a disk drive system has been described.

I claim:

1. In a magnetic recording system which includes a magnetic disk for storing data in a pattern of remnant magnetization, a rotary moving coil actuator for selectively positioning a transducer across said disk to access data stored thereon, said actuator comprising:
   a frame having a pair of radial slots;
   a body pivotable about an axis;
   a pair of magnets mounted to said frame along said slots;
   a coil securely attached to said body, said coil passing through said radial slots and adjoining said magnets, said coil moving across said slots in an arcuate path from a first position to a second position, thereby pivoting said body, during a data stroke; and
   at least one notch formed in said frame at a point midway along said arcuate path, said coil and notch each having first and second edges such that when said coil is in said first position, said first edge of said notch coincides with said first edge of said coil, and when said coil is in said second position, said second edge of said notch coincides with said second edge of said coil, said notch reducing the magnetic flux density at said point, thereby linearizing the torque of said actuator across said data stroke.

2. The actuator of claim 1 wherein said slots define a centerpole member therebetween and said frame further comprises land members attached to the ends of said centerpole member which increase the flux density near said ends of said data stroke.

3. The actuator of claim 2 wherein said frame comprises steel.

4. The actuator of claim 3 wherein said at least one of said land members comprises a steel sleeve fitted over one of said ends of said centerpole member, said sleeve reducing the air gap between said centerpole member and said magnets in a region beyond said arcuate path.

5. The actuator of claim 2 wherein said notch is formed in said centerpole member.

6. In a magnetic recording system which includes a magnetic disk for storing data in a pattern of remnant magnetization, a rotary moving coil actuator for selectively positioning a transducer across said disk to access data stored thereon, said actuator comprising:
   a body having first and second sides and an intermediately located pivot point;
   an arm having first and second ends, said arm being attached to said first side of said body at said first end and to said transducer at said second end;
   a coil attached to said second side of said body and having first and second coil sides positioned generally perpendicular to said disk, said first and second coil sides forming a space there between;
   a frame having a pair of substantially parallel radial slots separated by a centerpole member, said first and second coil sides tracing an arcuate path in response to a current passing through said coil from a first position to a second position in said slots during a data stroke wherein said body pivots about said pivot point with said centerpole member occupying said space;
   first and second magnets attached to said frame in said slots, each of said magnets extending substantially across the radial length of said slots such that said first and second coil sides adjoin said first and second magnets, respectively, during said data stroke;
   a notch formed in said frame at a point midway across said arcuate path, said notch and said coil each having first and second edges, said first edge of said notch coinciding with said first edge of said coil whenever said coil is in said first position, and said second edge of said notch coinciding with said second edge of said coil whenever said coil is in said second position, said notch reducing the magnetic flux density at said point to linearize the torque of said actuator across said data stroke.

7. The actuator of claim 6 wherein said frame comprises steel.

8. The actuator of claim 6 further comprising a sleeve member fitted over one of said ends of said centerpole member, said sleeve member reducing the air gap between said centerpole member and said magnets in a region beyond said arcuate path, said sleeve member increasing the flux density in said region.

9. The actuator of claim 8 wherein said frame and said sleeve member both comprise steel.

10. The actuator of claim 6 wherein said notch is formed in said centerpole member adjoining said first coil side.

11. In a magnetic recording system which includes a magnetic disk for storing data in a pattern of remnant magnetization, a rotary moving coil actuator for selectively positioning a transducer across said disk to access data stored thereon, said actuator comprising:

an actuator body having first and second sides and an intermediately located pivot point;

an actuator arm having first and second ends, said arm being attached to said first side of said actuator body at said first end and to said transducer at said second end;

a coil attached to said second side of said actuator body and having first and second coil sides positioned generally perpendicular to said disk, said first and second coil sides forming a space therebetween;

a frame having a pair of substantially parallel, radial slots separated by a centerpole member, said first and second coil sides tracing an arcuate path in response to a current passing through said coil from a first position to a second position in said slots during a data stroke, wherein said actuator body pivots about said pivot point with said centerpole member occupying said space;

first and second magnets mounted to said frame along said slots, each of said magnets extending substantially across the radial length of said slots such that said first and second coil sides adjoin said first and second magnets, respectively, during said data stroke, said first magnet having a notch for reducing magnetic flux density in a location approximately midway across said arcuate path, said notch and said coil each having first and second edges such that whenever said coil is in said first position said first edge of said notch coincides with said first edge of said coil, and whenever said coil is in said second position said second edge of said notch coincides with said second edge of said coil, said notch linearizing the torque of said actuator across said data stroke;

said actuator further comprising a sleeve member fitted over one end of said centerpole member for reducing the air gap between said centerpole member and said magnets in a region beyond said arcuate path, thereby increasing the flux density in said region.

12. The actuator of claim 11 wherein said frame and said sleeve member both comprise steel.

* * * * *